United States Patent [19]
Chang

[11] Patent Number: 6,131,600
[45] Date of Patent: Oct. 17, 2000

[54] STRUCTURE OF A COLD AND HOT WATER MIXING VALVE OF A BALANCE VALVE

[76] Inventor: Chia-Bo Chang, No. 335, Chang-Ting Road, Lukang, Changhua Hsien, Taiwan

[21] Appl. No.: 09/316,473

[22] Filed: May 21, 1999

[51] Int. Cl.[7] .................................................. G05D 11/16

[52] U.S. Cl. ................ 137/100; 137/315.05; 137/315.11

[58] Field of Search ........................ 137/98, 100, 315.05, 137/315.11, 454.6

[56] References Cited

U.S. PATENT DOCUMENTS

| | | | |
|---|---|---|---|
| 3,688,790 | 9/1972 | Esten | 137/98 |
| 4,325,403 | 4/1982 | Uhlmann | 137/454.6 X |
| 5,983,918 | 11/1999 | Chang | 137/98 |

*Primary Examiner*—Stephen M. Hepperle
*Attorney, Agent, or Firm*—Pro-Techtor Inter-National Services

[57] ABSTRACT

An improved structure of the cold and hot water mixing valve of a balance valve is disclosed. Sealing trenches are installed on the upper surface of the concave portion on the lower wall of the mixing valve gate body and the lower surface of the balance valve cover plate along the water through holes and with a proper distance to the periphery of the upper and lower seats of the balance valve. A balance valve sealing is placed between the two sealing trenches. Sealing trenches are installed on upper surface of the balance valve cover plate and the lower surface of a fixing disk with a proper distance along the periphery of the water through holes. The depths of the sealing trenches are slightly smaller the radii of the cross section of the sealing ring strip for sealing. Therefore, the sealing can be assembled easily. After assembling, the sealing ring strip is positioned steadily. A preferred sealing effect can be derived easily.

2 Claims, 5 Drawing Sheets

6,131,600

STRUCTURE OF A COLD AND HOT WATER MIXING VALVE OF A BALANCE VALVE

BACKGROUND OF THE INVENTION

1. Field of The Invention

The present invention relates to an improved structure of the cold and hot water mixing valve of a balance valve, and especially to a structure for improving the sealing features of the fixing disk and the balance valve cover plate, and the balance valve cover plate and the lower wall of the mixing valve of the cold and hot water mixing valve.

2. Description of the Prior Art

U.S. Pat. No. 5,983,918 "Balancing Valve Assembly of a Cold and Hot Water Mixing Valve" is disclosed by the applicant of the present invention. In the prior art, a concave portion is installed on the lower wall of the mixing valve gate. A concave lower seat of a balance valve is installed with the hot water inlet. A sealing trench is installed on the concave portion along the water outlet preset on the lower wall and the peripheral of the lower seat of the balance valve. Besides, a balance valve cover plate symmetric to the shape of the concave portion of the gate body is further installed. The balance valve cover plate is also symmetric to the lower wall of the gate body. While a concave balance valve upper seat is installed below the cold and hot water inlet. Accordingly, the balance valve cover plate can be fixed within the concave portion of the gate body. Then a sealing is engaged in the trench of the lower wall of the gate so that the lower seat of the balance valve of the gate body and the upper seat of the balance valve of the cover plate are formed as a drain-preventing space. Thus, a balance valve body is fixed therewithin. Therefore, the components can be assembled easily and rapidly. The assembled structure is steady.

In the prior art, a sealing trench is installed on the water through holes and the periphery of the lower seat of the balance valve. A sealing ring with a shape symmetric to that of the sealing trench is embedded into the trench for water-sealing to the contact interface between the balance valve cover plate and the lower wall of the gate body. A further sealing trench is installed on the periphery of the water through hole on the upper surface of the balance valve improved structure of the cold and hot water mixing valve of a balance valve, and a matched sealing ring having a shape symmetric to that of the sealing trench is embedded thereinto for providing a water-sealing to the contact interface between the fixing disk and the balance valve cover plate. In this sealing structure, the sealing ring is located in the trench on one surface of the contact interface. By the part of the sealing ring protruded from the trench, it contacts with a respect flat surface. The flat surface applies a pressure to the protruded portion from the sealing ring so as to form a sealing feature by a contact interface. The sealing effect is determined by the positioning ability of the sealing ring, that is the compressing force of the flat surface applied to the sealing ring.

It is appreciated that in the practical application of a cold and hot water mixing valve, in some applications, water flow through the water through holes has a larger flow velocity and water pressure. For example, the high water pressure of a tall building or high pressure flush water, etc. Thus, the aforementioned prior art is installed with a balance valve in the cold and hot water mixing valve for preventing abnormal water pressure variation to cause the threat from using water in safety. For the sealing structure of the prior art, this high pressure water flow will destroy the sealing feature, even the sealing ring will displace so that one part of the sealing ring will move out of the respective position or out of a trench. This abnormal condition will cause the sealing ring to be clamped between the disk and the edge of the trench of the positioning trench so to deform or wear out completely and thus the sealing feature will loss completely. Besides, by enhancing the pressure between the contact interfaces to increase sealing effect, this will induce that the fixing disk and the movable disk within the valve body are compressed tightly. As a result, the water control valve can not be operated easily.

SUMMARY OF THE PRESENT INVENTION

In order to improve the aforementioned defect, the object of the present invention is to provide an improved structure of the cold and hot water mixing valve of a balance valve. Wherein each of the contact interfaces is formed with a respective sealing trench on the surface thereof so the sealing ring can be assembled easily and after assembling, the sealing ring can be positioned steadily. A preferred sealing effect can be derived easily. Thus, the defects in the prior art can be avoided.

The various objects and advantages of the present invention will be more readily understood from the following detailed description when read in conjunction with the appended drawing.

DESCRIPTION OF THE PREFERRED EMBODIMENT

Figure 1:
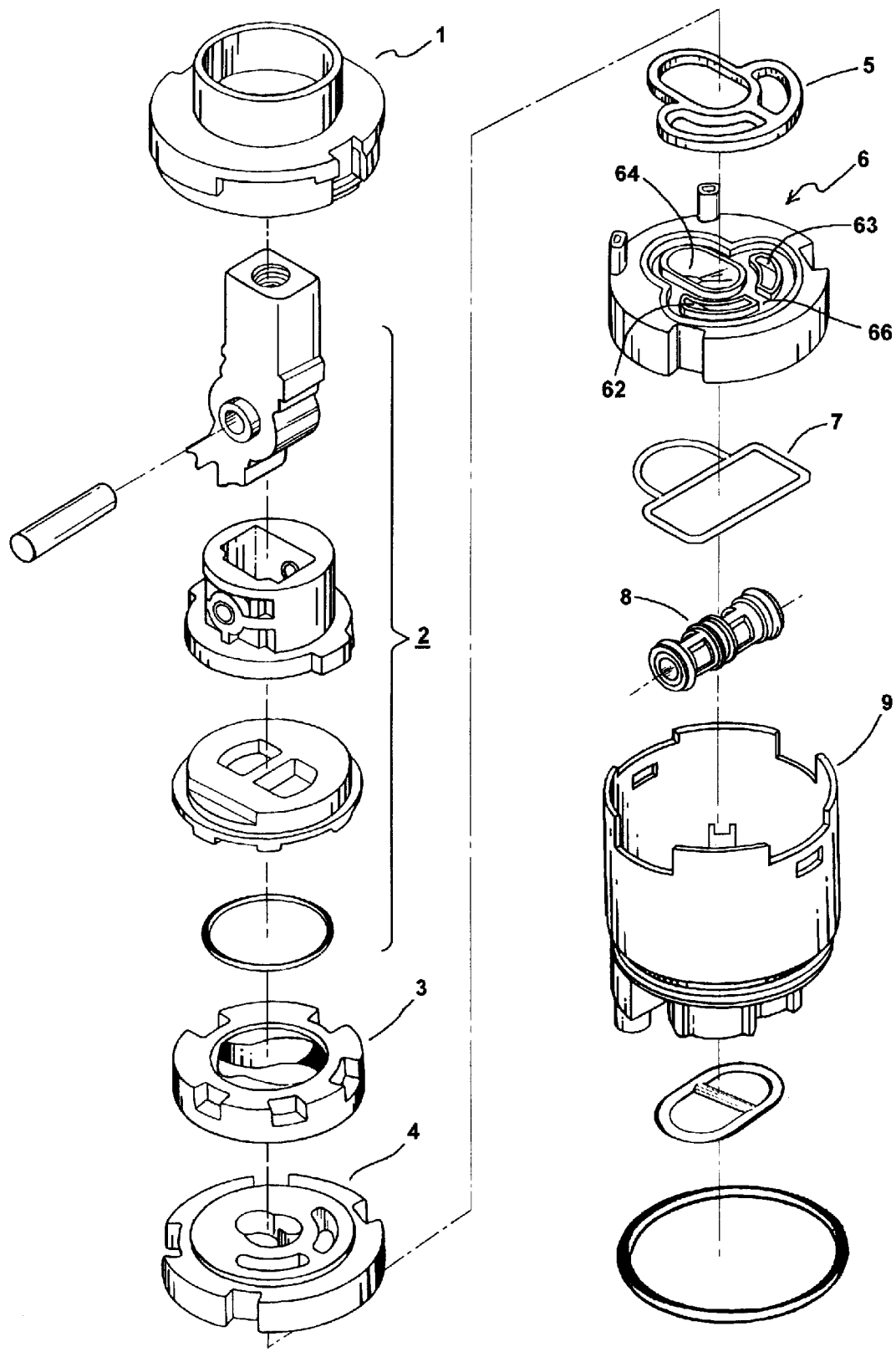
FIG. 1 is a perspective view showing individual components of the present invention.
Figure 2:
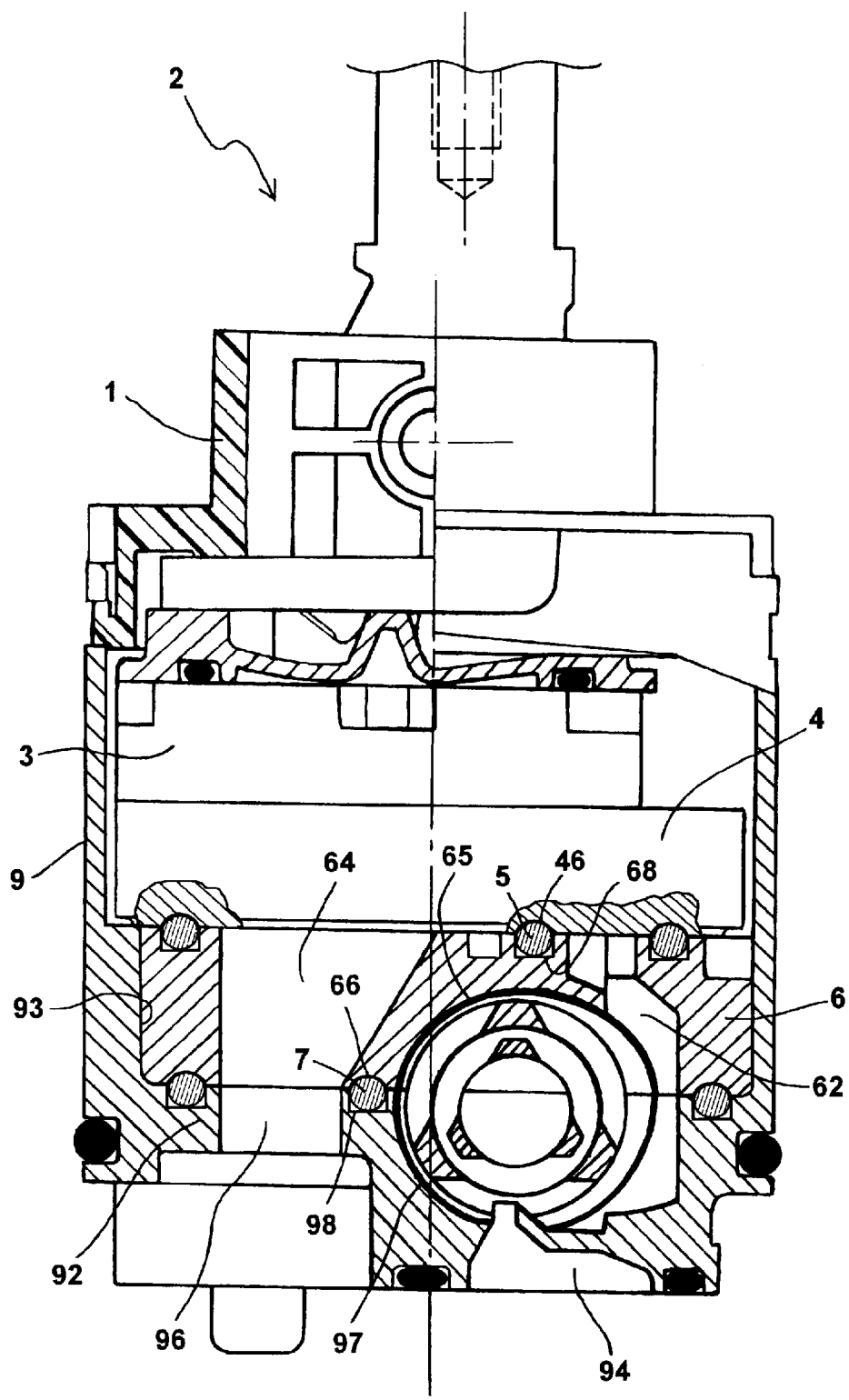
FIG. 2 is a cross sectional view showing the assembly of the present invention.
Figure 3:
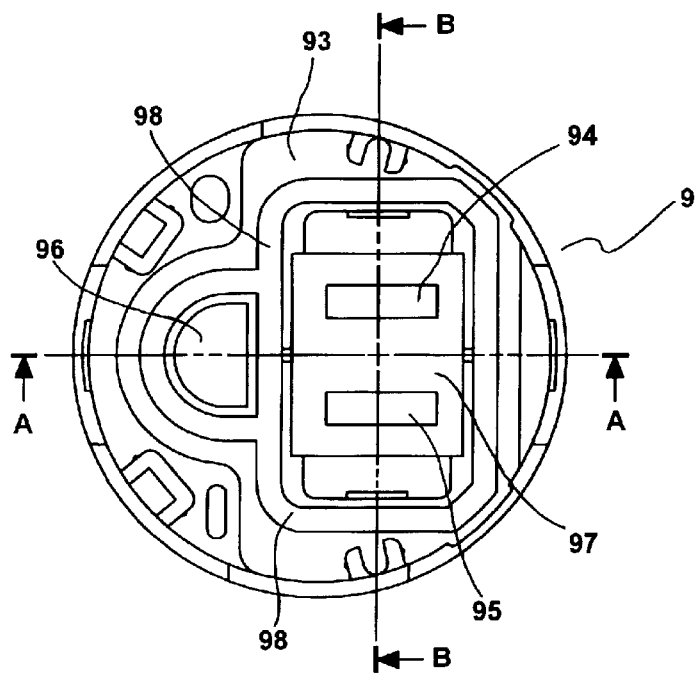
FIG. 3 is a top view of the gate body according to the present invention.
Figure 4:
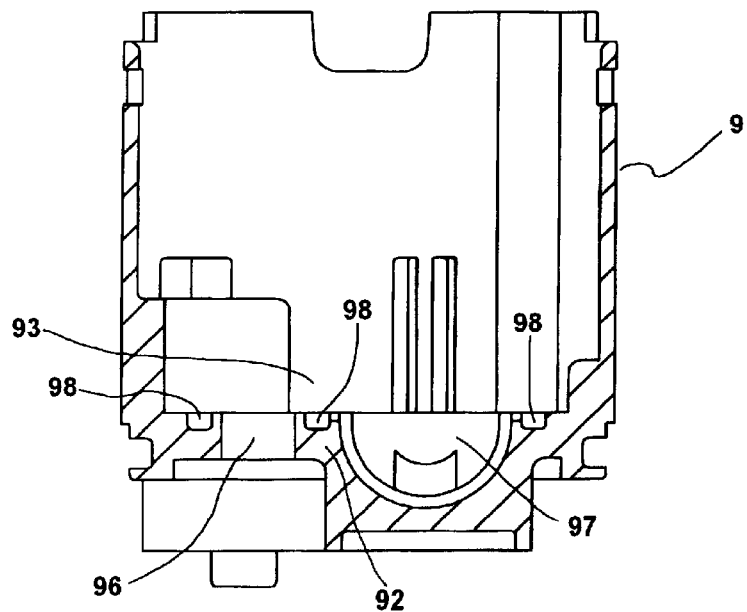
FIG. 4 is a cross sectional view along the line A—A of FIG. 3.
Figure 5:
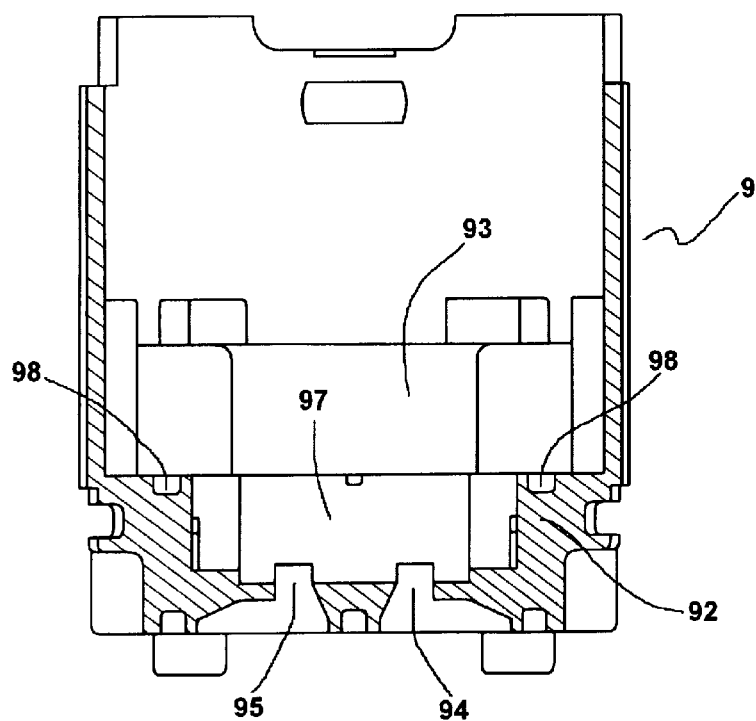
FIG. 5 is a cross sectional view along the line B—B of FIG. 3.
Figure 6:
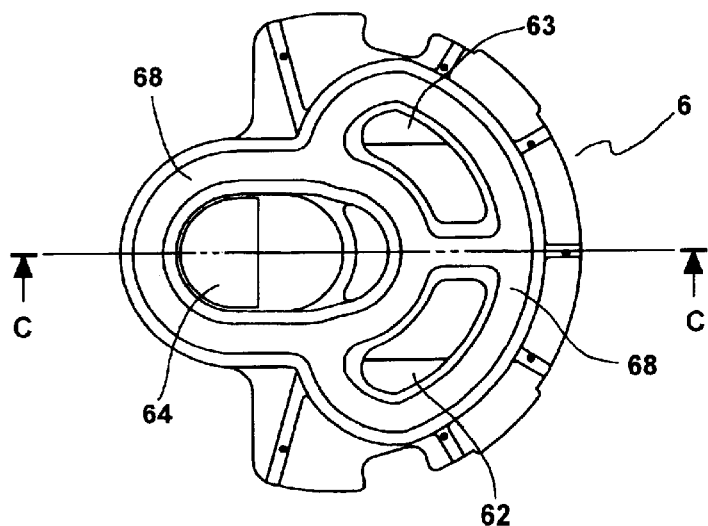
FIG. 6 is a top view of the components of the balance valve cover plate according to the present invention.
Figure 7:
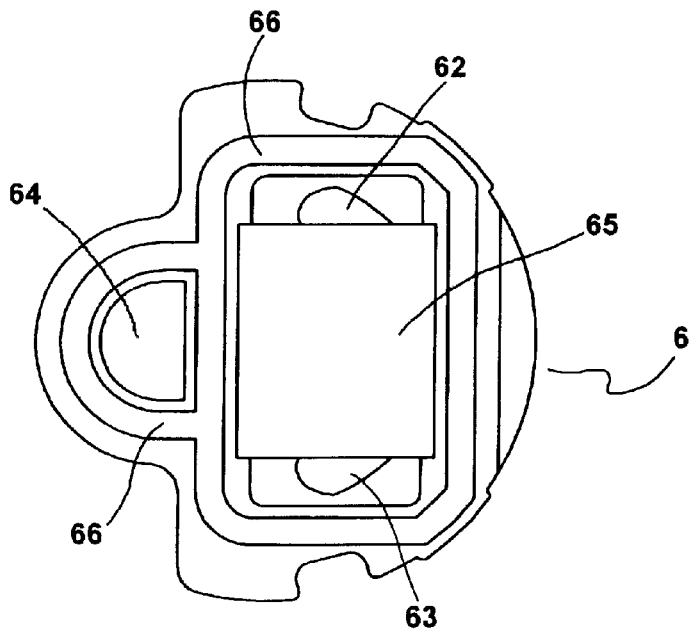
FIG. 7 is a bottom view of the components of the balance valve cover plate according to the present invention.
Figure 8:
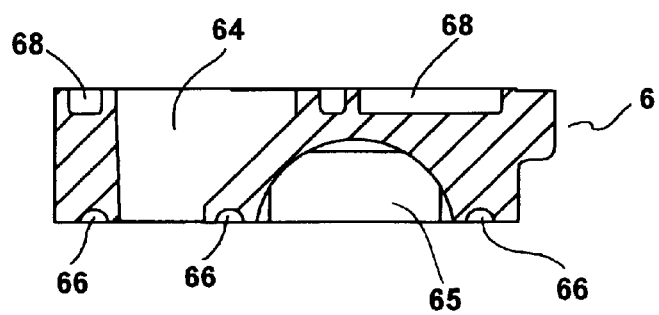
FIG. 8 is a cross sectional view along the line C—C of FIG. 6.
Figure 9:
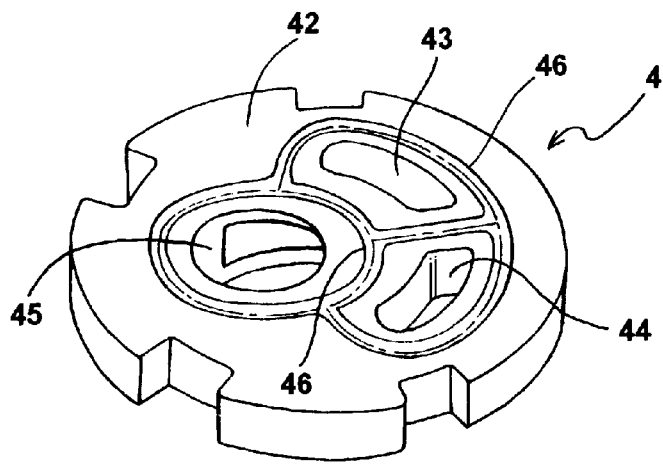
FIG. 9 is a perspective view of the fixing disk according to the present invention showing the trench on the bottom of the disk for being used by sealing ring.

With reference to the appended figures, the components of the present invention is approximately similar to those of the prior art. The present invention includes a gate cap 1, a joystick control device formed by a set of joystick, joystick seat, a hat, a sealing, a movable disk 3, a fixing disk 4, a disk sealing 5, a balance valve cover plate 6, a balance valve sealing 7, a balance valve body 8 and a gate body 9.

A concave portion 93 is installed on the upper surface of the lower wall 92 of the gate. Penetrated cold and hot water inlets 94 and 95 and the water outlet for mixing water 96 are installed within the area enclosed by the concave portion 93 on the lower wall 92. A concave lower seat 97 is installed above the hot and cold water inlet 94 and 95. A sealing trench 98 is formed in the concave portion 93 with a proper distance to the periphery of the balance valve lower seat 97 along the water outlet 96. The sealing trench 98 has a depth slightly smaller than the radius of the cross section of the ring strip of the balance valve sealing 7.

The balance valve cover plate 6 has a shape suitable to be embedded into the concave portion 93 of the gate body. The cold and hot water inlets 62 and 63, and the water outlet 64 of mixing water are penetrated through the balance valve cover plate 6 symmetric to the gate body 9. A concave balance valve upper seat 65 is installed below cold and hot water inlets 62 and 63. Moreover, a sealing trench 68 is formed on the lower surface of the balance valve cover plate 6 along periphery of the water outlet 64. The shape of the sealing trench 68 is wholly symmetric to the shape of the sealing trench 68 in the concave portion 68 of the gate and a smaller depth. A sealing trench 66 is installed on the upper surface 6 along the periphery of the penetrating water through holes 62, 63, and 64 and with a proper distance to the periphery of the holes. The depth of the sealing trench 66 is slightly smaller than the radius of the ring strip cross section of the disk sealing 5.

The fixing disk 4 is also symmetric to the upper surface of the balance valve cover plate 6 and is installed with penetrated cold and hot water inlets 43 and 44 and the water outlet of the mixing water. Besides, a sealing trench 46 is formed on the surface 42 along the periphery of the water through holes and with a proper distance to the periphery of the holes. The shape of the trench 46 is completely symmetric to the sealing trench 66 on the upper surface of the balance valve cover plate and has a slightly depth.

The disk sealing 5 has a shape symmetric to the sealing trencher 46 and 66 so that it can be engaged between the two trenches. The balance valve sealing 7 has a shape symmetric to that of the trenches 98 and 68 so that it can be engaged between the two trenches.

During assembled aforementioned sealing structure, the balance valve sealing 7 is firstly engaged to the sealing trench 98 of the gate concave portion with a deeper depth so as to be positioned therein. Then the balance valve cover plate is engaged into the concave portion 93 of the gate body so that the balance valve sealing 7 is compressed in the trenches 98 and 68, and then the balance valve body 8 is fixed to the lower seat 97 of the balance valve of the gate body so to form a space. Then disk sealing 5 covers the sealing trench 66 on the upper surface of the balance valve cover plate so as to be positioned therein. Then, the fixing disk 4 serves to press the disk sealing 5 within the sealing trench 46 and 66. Then, other components are sequentially assembled within the gate body 9.

According to the aforementioned structure, the contact interface between the gate concave portion 93 and the balance valve cover plate 6 and the contact interface between the balance valve cover plate 6 and the fixing disk 4 are formed as an effective drain preventing structure.

Since the depths of the trenches 98, 68, 46 and 66 are smaller than the radius of the cross section of the sealing ring strip, the sealing ring strip can be positioned easily so that the sealing strip can be easily embedded into the trenches. During assembly, it only needs to be approximately aligned. All parts of the sealing ring strip can be guided into the sealing trench automatically. Therefore, it can be operated easily. The sealing ring will not be destroyed by clamping so as to loss the sealing function. Since the assembled sealing ring strip are distributed in the upper and lower surfaces of the contact interface with an approximately equal parts. Thus, by a small pressure, the periphery of the sealing ring strip will deform so as to be tightly adhered to the walls on the two sides of the trench to form a contact surface for sealing.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An improved structure of the cold and hot water mixing valve of a balance valve comprising a gate cap, a joystick control device formed by a set of a joystick, a joystick seat, a hat, and a sealing, a movable disk, a fixing disk, a disk sealing, a balance valve cover plat, a balance valve sealing, a balance valve body and a gate body, a concave portion being installed on the lower wall of the mixing gate, which is exactly covered by a balance valve cover plate, the concave portion and the bottom surface of the balance valve cover plate near the cold and hot water inlets being installed with a balance valve upper seat and a balance valve lower seat, respectively; characterized in that:

a first sealing trench is installed on the concave portion of the lower wall of the gate body along the water through holes and with a proper distance to the periphery around the balance valve lower seat, a second sealing trench is installed on the lower surface of the balance valve cover plate and with a proper distance with the periphery around the balance valve upper seat, a third sealing trench is installed on the upper surface of the balance valve cover plate along the periphery of the water through holes and with a proper distance to the periphery of the hole; a fourth sealing trench is installed on the lower surface of the fixing disk along the periphery of the water through holes and with a proper distance to the periphery of the holes, wherein the sealing trench on the concave portion has a shape symmetric to that of the sealing trench on the lower surface of the balance valve cover plate, and the sealing trench on the upper surface of the balance valve cover plate has a shape symmetric to that of sealing trench on the lower surface of the fixing disk, the depths of the sealing trenches are smaller than that of the radii of the cross sections of the sealing ring strips for sealing; the sealing of the balance valve is located between the sealing trenches of the concave portion and the lower surface of the balance valve cover plate, and disk sealing is located between the sealing trenches of the upper surface of the balance valve cover plate and the lower surface of the fixing disk.

2. The improved structure of the cold and hot water mixing valve of a balance valve as claimed in claim 1, wherein the sealing trench on the lower surface of the balance valve cover plate has a depth slightly smaller than that of the sealing trench of the concave portion, and sealing trench on the lower surface of the fixing disk has a depth slightly smaller than that of the sealing trench on the upper surface of the balance valve cover plate.

* * * * *